US008798661B2

(12) United States Patent
Chin et al.

(10) Patent No.: US 8,798,661 B2
(45) Date of Patent: Aug. 5, 2014

(54) METHOD AND APPARATUS FOR DETERMINING OUTPUT TRANSMIT POWER FOR AN ACCESS CHANNEL IN A WIRELESS COMMUNICATION NETWORK

(75) Inventors: Tom Chin, San Diego, CA (US); Bao Nguyen, Corona, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 11/317,741

(22) Filed: Dec. 23, 2005

(65) Prior Publication Data

US 2007/0149235 A1 Jun. 28, 2007

(51) Int. Cl.
| | |
|---|---|
| H04B 1/00 | (2006.01) |
| H04B 7/00 | (2006.01) |
| H04M 1/66 | (2006.01) |
| H04M 1/68 | (2006.01) |
| H04M 3/16 | (2006.01) |
| H04W 24/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04W 4/00 | (2009.01) |
| H04B 7/216 | (2006.01) |
| H04L 27/00 | (2006.01) |

(52) U.S. Cl.
USPC .......... 455/522; 455/69; 455/410; 455/456.1; 370/252; 370/328; 370/342; 375/259

(58) Field of Classification Search
CPC ..... H04W 52/00; H04W 52/04; H04W 52/08; H04W 52/10; H04W 52/146; H04W 52/226; H04W 52/228; H04W 52/362; H04W 52/12; H04W 52/16; H04W 52/40; H04W 52/44; H04W 52/48; H04W 52/50; H04W 52/0258; H04W 52/221; H04W 52/223; H04W 52/225; H04W 52/247; H04W 52/286; H04W 52/287; H04W 52/367; H04W 56/0005; H04M 15/58
USPC ............ 455/13.4, 67.13, 68, 69, 70, 84, 125, 455/126, 127.1, 127.2, 134, 136, 137, 138, 455/404.1, 404.2, 405, 418, 419, 420, 455/456.1, 456.2, 511, 515, 517, 522, 9, 455/417, 436, 572, 10, 67.11, 12.1, 13.1, 455/115.1, 226.1, 423, 442, 447, 51, 574, 455/51.1, 53.1, 67.1, 67.3, 1, 15.1, 276.1, 455/253, 410, 427, 446, 452.1, 512; 370/252, 318, 328, 335, 519, 331, 332, 370/342, 345, 232, 329, 352, 442, 458, 503, 370/516, 517; 375/130, 219, 200, 203, 205, 375/211, 222, 224, 322, 323, 325, 346, 354, 375/356, 371; 342/357.1, 357.09, 352, 356; 704/270; 711/137, 154
See application file for complete search history.

(56) References Cited

U.S. PATENT DOCUMENTS

| | | | | | |
|---|---|---|---|---|---|
| 5,657,323 | A | * | 8/1997 | Jan et al. | 370/252 |
| 5,867,109 | A | * | 2/1999 | Wiedeman | 455/13.1 |
| 5,903,844 | A | * | 5/1999 | Bruckert et al. | 455/456.2 |
| 6,487,420 | B1 | * | 11/2002 | Jonsson | 455/522 |
| 6,529,482 | B1 | * | 3/2003 | Lundby | 370/252 |
| 6,594,240 | B1 | * | 7/2003 | Chuah et al. | 370/328 |
| 6,718,171 | B1 | * | 4/2004 | Hunzinger | 455/450 |
| 6,750,813 | B2 | * | 6/2004 | Vargas-Hurlston et al. | 342/357.09 |
| 7,158,792 | B1 | * | 1/2007 | Cook et al. | 455/450 |
| 7,292,874 | B2 | * | 11/2007 | Cave et al. | 455/522 |
| 7,555,276 | B2 | * | 6/2009 | Wilcox | 455/276.1 |
| 7,865,209 | B2 | * | 1/2011 | Kim et al. | 455/522 |
| 2002/0183086 | A1 | | 12/2002 | Hellmark et al. | |
| 2003/0142632 | A1 | * | 7/2003 | Lin et al. | 370/252 |
| 2004/0029604 | A1 | * | 2/2004 | Raaf | 455/522 |
| 2004/0085909 | A1 | * | 5/2004 | Soliman | 370/252 |
| 2004/0147274 | A1 | * | 7/2004 | Khawand et al. | 455/522 |

| | | | | |
|---|---|---|---|---|
| 2004/0219920 | A1* | 11/2004 | Love et al. | 455/442 |
| 2005/0047371 | A1* | 3/2005 | Bennett | 370/331 |
| 2005/0197134 | A1 | 9/2005 | McKenna et al. | |
| 2006/0114827 | A1* | 6/2006 | Harris et al. | 370/232 |
| 2010/0290440 | A1* | 11/2010 | Grimminger et al. | 370/338 |

FOREIGN PATENT DOCUMENTS

| | | | |
|---|---|---|---|
| CN | 1415141 A | 4/2003 | |
| JP | 7250377 A | 9/1995 | |
| JP | 8508628 | 9/1996 | |
| JP | 2001251236 A | 9/2001 | |
| JP | 2003069492 A | 3/2003 | |
| JP | 2003511962 T | 3/2003 | |
| JP | 2004511951 A | 4/2004 | |
| JP | 2004297186 A | 10/2004 | |
| WO | WO9512935 A1 | 5/1995 | |
| WO | WO 9717769 A2 * | 5/1997 | H04B 7/005 |
| WO | 0128126 | 4/2001 | |
| WO | WO-0232010 A1 | 4/2002 | |
| WO | WO-2005006797 A1 | 1/2005 | |
| WO | WO-2005055462 A1 | 6/2005 | |

OTHER PUBLICATIONS

International Search Report—PCT/US06/062178—International Search Authority—European Patent Office—Nov. 7, 2007.
Written Opinion—PCT/US06/062178—International Search Authority—European Patent Office—Nov. 7, 2007.

* cited by examiner

*Primary Examiner* — Bobbak Safaipour
*Assistant Examiner* — Paul P Tran
(74) *Attorney, Agent, or Firm* — Kevin T. Cheatham

(57) ABSTRACT

A wireless device stores historical information for a prior access attempt and uses this information to lower the output transmit power for a current access attempt on an access channel. The historical information may include RF conditions for the prior access attempt, the performance for the prior access attempt, and a power value used for the prior access attempt. The power value may be a power adjustment or an initial power level. For the current access attempt, the wireless device obtains the historical information, determines the current RF conditions, and determines a power value for this access attempt based on the current RF conditions and the historical information. The wireless device determines the output power for each access probe based on the power value and other applicable parameters and sends each access probe at the determined output power. The wireless device updates the historical information upon completing the access attempt.

23 Claims, 8 Drawing Sheets

METHOD AND APPARATUS FOR DETERMINING OUTPUT TRANSMIT POWER FOR AN ACCESS CHANNEL IN A WIRELESS COMMUNICATION NETWORK

BACKGROUND

I. Field

The present disclosure relates generally to communication, and more specifically to techniques for transmitting on an access channel in a wireless communication network.

II. Background

Wireless multiple-access communication networks are widely deployed to provide various communication services such as voice, packet data, video, broadcast, messaging, and so on. These networks can support communication for multiple wireless devices (e.g., cellular phones) by sharing the available system resources. Examples of such multiple-access networks include Code Division Multiple Access (CDMA) networks, Time Division Multiple Access (TDMA) networks, and Frequency Division Multiple Access (FDMA) networks.

A wireless device typically transmits on an access channel in order to gain access to a multiple-access network and for other purposes. For example, a wireless device may transmit on the access channel to register with the network when the device is powered on, to originate a voice or data call with the network, to inform the network of the device's whereabouts so that the network can page the device if needed, and so on. The manner in which a wireless device can transmit on the access channel is typically specified and/or controlled by the network. For example, the network may specify how often a wireless device can transmit on the access channel, what output power level to use when transmitting on the access channel, and so on.

The access channel is a common channel that is shared by all wireless devices. The network typically controls operation on the access channel such that all wireless devices can access the network with a desired success rate. Hence, the controls imposed or suggested by the network are typically conservative. The wireless devices are often dispersed throughout the network and observe different channel conditions. Having all of the wireless devices transmitting on the access channel based on the conservative controls imposed or suggested by the network often results in a waste of valuable system resources.

There is therefore a need in the art for techniques to more efficiently transmit on the access channel.

SUMMARY

Techniques for transmitting on an access channel in a multiple-access communication network with lower output power on average are described herein. A wireless device stores historical information for a prior access attempt and uses this information to lower the output power for a new access attempt, if possible. The historical information may include the radio frequency (RF) conditions observed for the prior access attempt, the performance for the prior access attempt, a power value used for the prior access attempt, and so on.

For the current access attempt, the wireless device obtains the historical information for the prior access attempt and determines the current RF conditions. The wireless device determines a power value for the current access attempt based on the current RF conditions and the historical information. The power value may be a power adjustment value, an initial power level, or some other value used to compute the output power for the access channel. The power value may be determined in various manners and may be adjusted in a closed loop manner to achieve good performance, as described below. The wireless device determines the output power for each access probe to be sent for the current access attempt based on the power value and other applicable parameters. The wireless device transmits each access probe at the determined output power. Upon completing the current access attempt, the wireless device updates the historical information to include the information for this access attempt.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless multiple-access communication networks such as a CDMA network, a TDMA network, an FDMA network, an orthogonal frequency division multiple access (OFDMA) network, a single-carrier frequency division multiple access (SC-FDMA) network, and so on. A CDMA network may implement one or more radio access technologies (RATs) such as cdma2000, Wideband-CDMA (W-CDMA), and so on. cdma2000 covers IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

In general, the techniques described herein may be used for any communication network in which a wireless device transmits on a common channel (e.g., an access channel) at less than full power. For example, the techniques may be used for a CDMA2000 1X network that implements IS-2000 and/or IS-95, a 1xEV-DO network that implements IS-856, and a Universal Mobile Telecommunication Systems (UMTS) network that implements W-CDMA. A cdma2000 network may be a CDMA2000 1X network or 1xEV-DO network. For clarity, much of the description below is for a CDMA2000 1X network.

Figure 1:
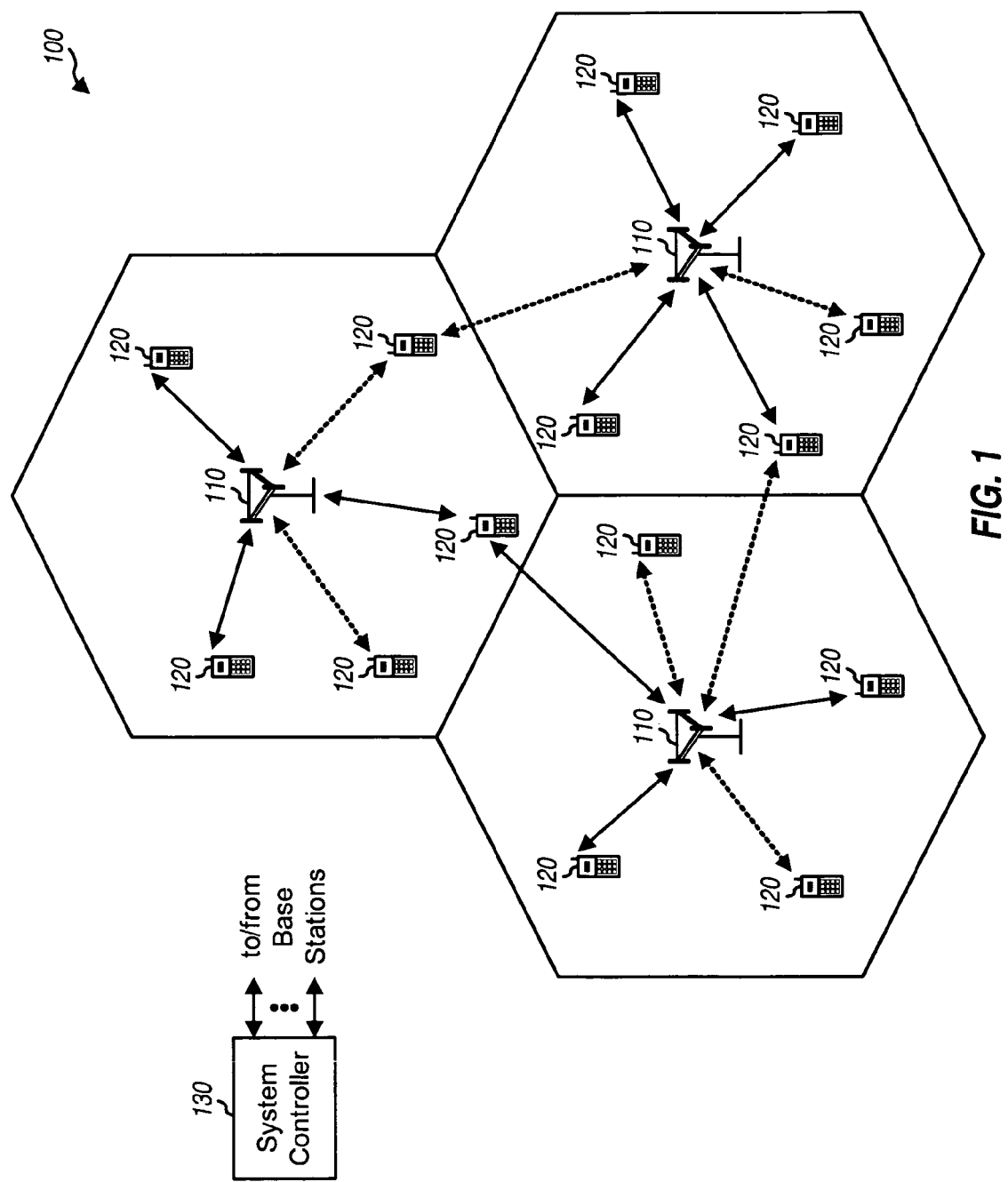
FIG. 1 shows a wireless multiple-access communication network.

FIG. 1 shows a wireless multiple-access communication network 100, which may be a CDMA2000 1X network, a 1xEV-DO network, or a UMTS network. Network 100 includes multiple base stations 110, with each base station providing communication coverage for a particular geographic area. A base station is generally a fixed station that communicates with the wireless devices. A base station (CDMA2000 1X terminology) may also be called an access point (1xEV-DO terminology), a Node B (UMTS terminology), a base transceiver station (BTS), or some other terminology.

Wireless devices 120 are typically dispersed throughout the network, and each wireless device may be fixed or mobile. A wireless device may also be called a mobile station (CDMA2000 1X terminology), an access terminal (1xEV-DO terminology), a user equipment (UMTS terminology), a subscriber unit, or some other terminology. A wireless device may be a cellular phone, a personal digital assistant (PDA), a wireless modem card, and so on. Each wireless device may communicate with zero, one, or possibly multiple base stations on the forward and reverse links at any given moment. The forward link (or downlink) refers to the communication link from the base stations to the wireless devices, and the reverse link (or uplink) refers to the communication link from the wireless devices to the base stations.

In FIG. 1, a solid line with arrows on both ends indicates communication between a wireless device and a base station. A dashed line with arrows on both ends indicates transmission of pilot and/or signaling on the forward link from a base station to a wireless device and possibly transmission on an access channel on the reverse link from the wireless device to the base station.

In cdma2000, a Reverse Access Channel (R-ACH) is used by a wireless device to initiate communication with a base station (e.g., to register with the network, to originate a call, and so on) and to respond to messages received on a Paging Channel. A Reverse Enhanced Access Channel (R-EACH) is used by a wireless device to initiate communication with a base station or to respond to a message sent specifically to the wireless device. The R-ACH and R-EACH are common channels that are shared by all wireless devices. A wireless device transmits on the R-ACH or R-EACH in accordance with random-access procedures described in 3GPP2 C.S0003-D, entitled "Medium Access Control (MAC) Standard for cdma2000 Spread Spectrum Systems," Revision D, Feb. 13, 2004, which is publicly available.

Figure 2:
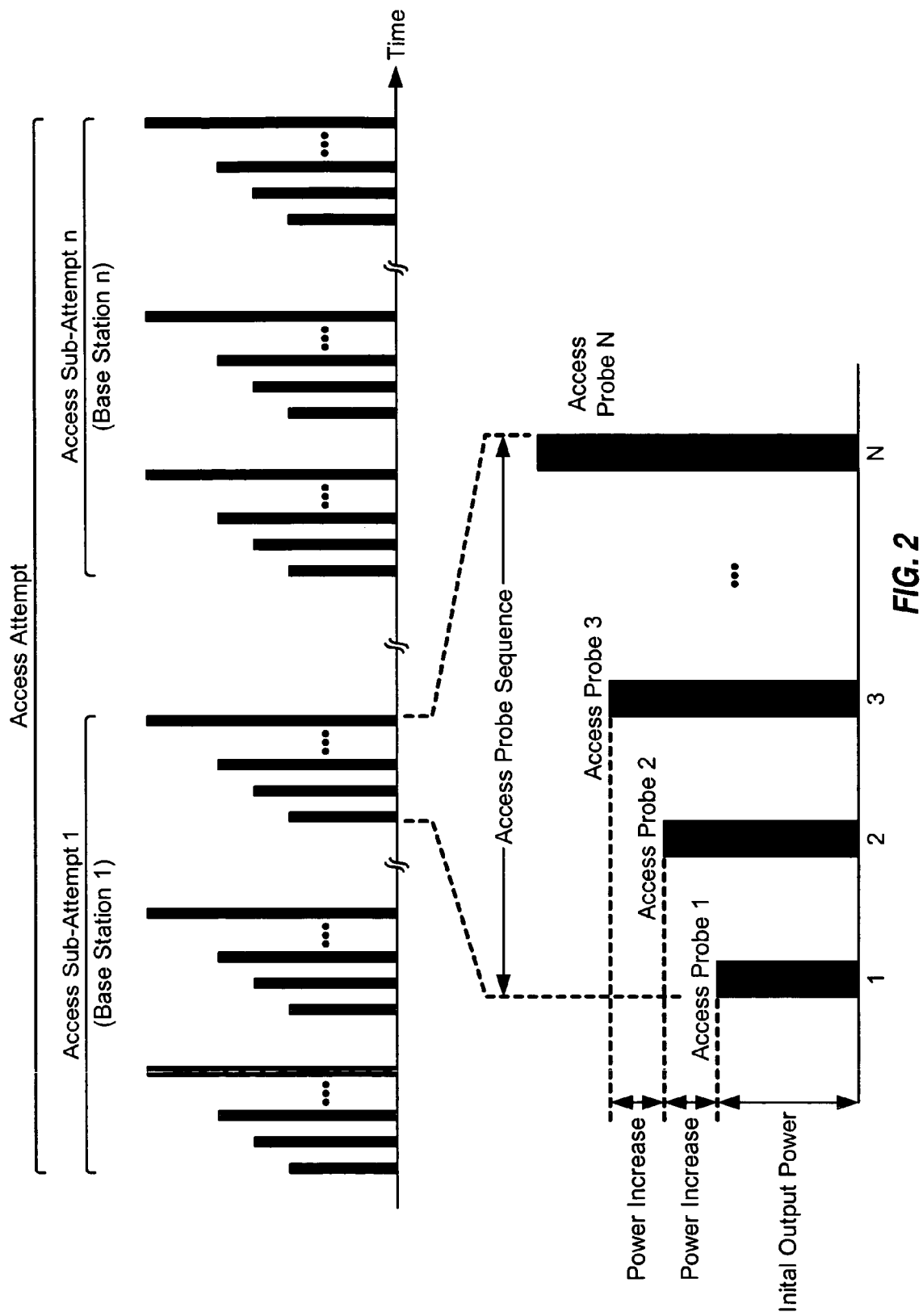
FIG. 2 shows transmission on a Reverse Access Channel (R-ACH) or Reverse Enhanced Access Channel (R-EACH) in cdma2000.

FIG. 2 shows a timeline for transmission on the R-ACH or R-EACH in cdma2000. An access attempt is an entire process for sending a protocol data unit (PDU) and either receiving or failing to receive an acknowledgment for the PDU. One access attempt includes one or more access sub-attempts. Each access sub-attempt is for a different base station and includes one or more access probe sequences. Each access probe sequence includes one or more access probes. Each access probe is a transmission on the R-ACH or R-EACH.

For each access probe sequence, a wireless device transmits the first access probe at an initial output power to a base station. The wireless device then listens for an acknowledgment from the base station. If an acknowledgment is not received, then the wireless device waits a pseudo-random duration, which is called a probe backoff, and then transmits the next access probe at higher output power. The wireless device transmits each subsequent access probe in the same manner. The wireless device continues to transmit access probes, one at a time, until either (1) an acknowledgment is received from the base station or (2) the maximum number of (N) access probes has been sent.

If the wireless device transmits all N access probes for an access probe sequence and does not receive an acknowledgment, then the wireless device waits a pseudo-random duration, which is called a sequence backoff, and then starts another access probe sequence. The wireless device transmits this new access probe sequence in the same manner as the prior access probe sequence.

The wireless device typically transmits each access probe on the R-ACH at a mean output power defined as follows:

$$\begin{aligned}\text{mean output}\\ \text{power (dB}m) \end{aligned} = -\text{mean input power (dB}m) + \\ \text{offset power} + \\ \text{interference correction} + \\ \text{NOM\_PWRs} - 16 \times \text{NOM\_PWR\_EXTs} + \\ \text{INIT\_PWRs} + \\ \text{PWR\_LVL} \times \text{PWR\_STEPs}, \quad \text{Eq (1)}$$

where mean input power is the received power at the wireless device;
 offset power is a value that is dependent on band class;
 interference correction=min {max(−7−ECIO, 0), 7};
 NOM_PWRs−16×NOM_PWR_EXTs is correction value;
 INIT_PWRs is an initial power offset provided by the base station;
 PWR_LVL is a non-negative power level adjustment step; and
 PWR_STEPs is the number of upward adjustments in output power.

The mean output power is the power used for a transmission on the R-ACH. In equation (1), the input power and output power are in units of dBm, and all other terms are in units of decibel (dB). The mean input power is also referred to as the received power, and the mean output power is also referred to as the transmit power.

In equation (1), ECIO is the received pilot energy per chip to total received power spectral density (Ec/Io) for the strongest received base station. NOM_PWRs, NOM_PWR_EXTs, INIT_PWRs, and PWR_LVL are static values that are broadcast by each base station in a System Access Parameter Message. The wireless device obtains the current static values from the base station and uses these static values to transmit on the R-ACH. NOM_PWRs, NOM_PWR_EXTs and INIT_PWRs define an initial power level provided by the base station, Pinit_bs, which may be given as:

$P\text{init}\_bs=\text{INIT}\_PWRs+\text{NOM}\_PWRs-16\times\text{NOM}\_ PWR\_\text{EXTs}.$  Eq (2)

The base station may individually specify INIT_PWRs, NOM_PWRs and NOM_PWR_EXTs. However, the base station typically sets NOM_PWRs=0 and $NOM_{13}$ PWR_EXTs=0, in which case Pinit_bs=INIT_PWRs. PWR_STEPs is equal to zero for the first access probe, one for the second access probe, and so on. The term (PWR_LVL×

PWR_STEPs) is equal to the increase in output power from the initial output power for the first access probe.

The equation for the output power for the R-EACH is similar to equation (1) for the R-ACH. The "offset power" is a different value for the R-EACH. The equations for the mean output power for the R-ACH and R-EACH are described in 3GPP2 C.S0002-D, entitled "Physical Layer Standard for cdma2000 Spread Spectrum Systems," Revision D, Feb. 13, 2004, which is publicly available.

Figure 3:
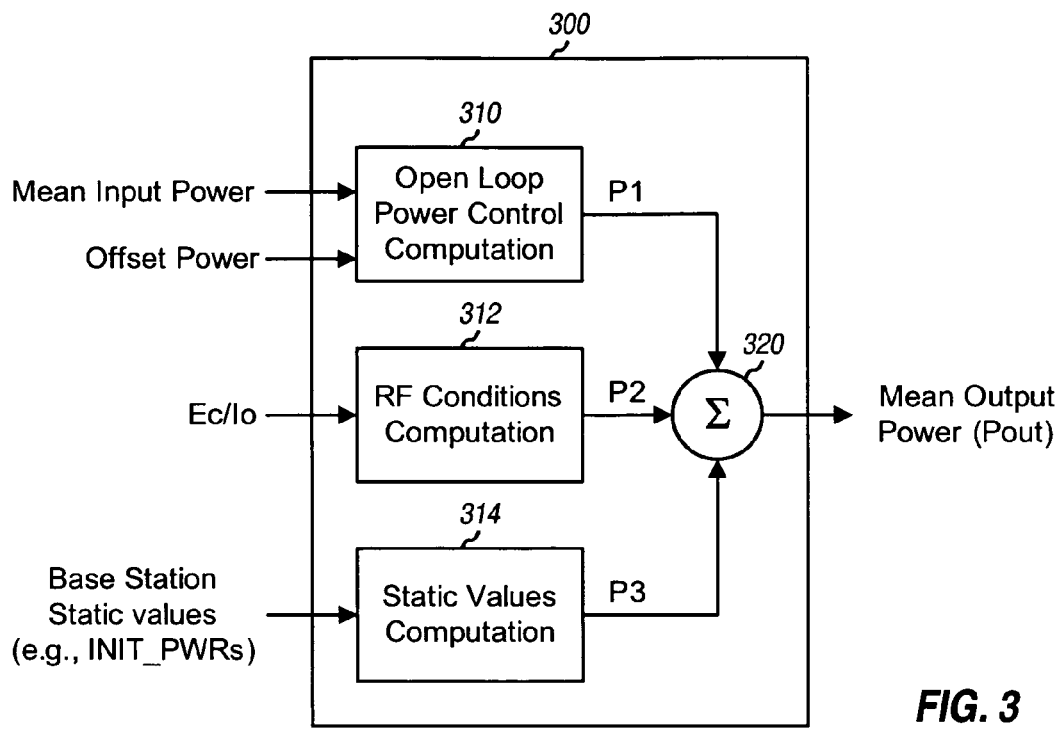
FIG. 3 shows computation of output power for the R-ACH or R-EACH.

FIG. 3 shows a model/apparatus 300 for computing the output power for each access probe sent on the R-ACH or R-EACH. The parameters in equation (1) may be grouped into three categories for open loop power control, RF conditions, and base station defined static values.

For apparatus 300, a unit 310 obtains the received power measured by the wireless device and the applicable offset power value and computes a first intermediate value, P1, for the open loop power control portion. The first intermediate value varies inversely with the received power, as indicated by the "−" sign in equation (1). Thus, a higher received power corresponds to a lower P1 value and hence a lower output power, and vice versa. The offset power is a fixed value that is determined by the channel type (e.g., R-ACH or R-EACH) and the band class (e.g., cellular or PCS band).

A unit 312 receives the Ec/Io (or ECIO) measured by the wireless device and computes a second intermediate value, P2, which is the interference correction. For the R-ACH, the interference correction is equal to min {max (−7−ECIO, 0), 7}, which means that the interference correction is equal to −7−ECIO but is constrained to be within a range of 0 to 7 dB. For the R-EACH, the interference correction is equal to min {max (IC_THRESH−ECIO, 0), IC_MAX}, where IC_THRESH and IC_MAX are provided by the base station.

A unit 314 receives the static values NOM_PWRs, NOM_PWR_EXTs, INIT_PWRs, and PWR_LVL provided by the base station and computes a third second intermediate value, P3. INIT_PWR has a range of −16 to +15 dB and a nominal value of 0 dB. PWR_STEPs has a range of 0 to 7 dB. The static values are broadcast by the base station.

A summer 320 sums the first, second and third intermediate values from units 310, 312 and 314, respectively, and provides the output power, which is Pout=P1+P2+P3. The first intermediate value can vary from access probe to access probe due to changes in the received power. The second intermediate value can also vary from access probe to access probe due to changes in the measured Ec/Io. The third intermediate value is equal to Pinit_bs for the first access probe in an access probe sequence and increases by PWR_LVL for each subsequent access probe in the sequence. The upward adjustment by PWR_LVL is intended to improve the likelihood of success after a failed access probe.

Each base station broadcasts the static values to use for access probes sent to that base station. The static values are typically defined for each base station such that good access performance can be achieved for all wireless devices within the coverage of that base station. The initial power level Pinit_bs is especially important since it determines the output power for each access probe sent by the wireless devices. A low initial power level results in lower output power being used for the access probes, which may result in a higher rate of access probe failures for some wireless devices. The higher failure rate results in more access probes being sent, which consumes battery power at the wireless devices and further causes more interference to other wireless devices in the network. The higher failure rate can also cause registration delay or failure, call setup delay or failure, user dissatisfaction, and possibly other deleterious effects. Consequently, a conservative initial power level is typically selected so that good performance can be achieved for all wireless devices.

For each base station, the initial power level Pinit_bs may be varied over time, e.g., based on system loading and/or other considerations. One initial power level is typically selected for use from among a finite set of initial power levels. The selected initial power level is broadcast to the wireless devices. Each wireless device uses the current initial power level broadcast by the base station.

The initial power level selected for use by the base station is typically a conservative value and is higher than necessary in many instances. For example, a study of a commercially deployed CDMA2000 1X network revealed that an initial power level of 0 or 7 dB is typically selected for use. Experimental tests in this study showed that a wireless device could use a lower initial power level (e.g., approximately 10 dB lower than the base station selected initial power level) without experiencing any noticeable degradation in performance in terms of registration delay/failure and call setup delay/failure.

In an aspect, a wireless device selects an initial power level, Pinit_wd, that is typically lower than the base station selected initial power level, Pinit_bs, but still provides good performance. The wireless device may select the initial power level Pinit_wd based on various parameters such as, e.g., the current RF conditions, historical information for a prior access attempt by the wireless device, and so on. The initial power level Pinit_wd may also be selected in various manners, as described below.

Figure 4:
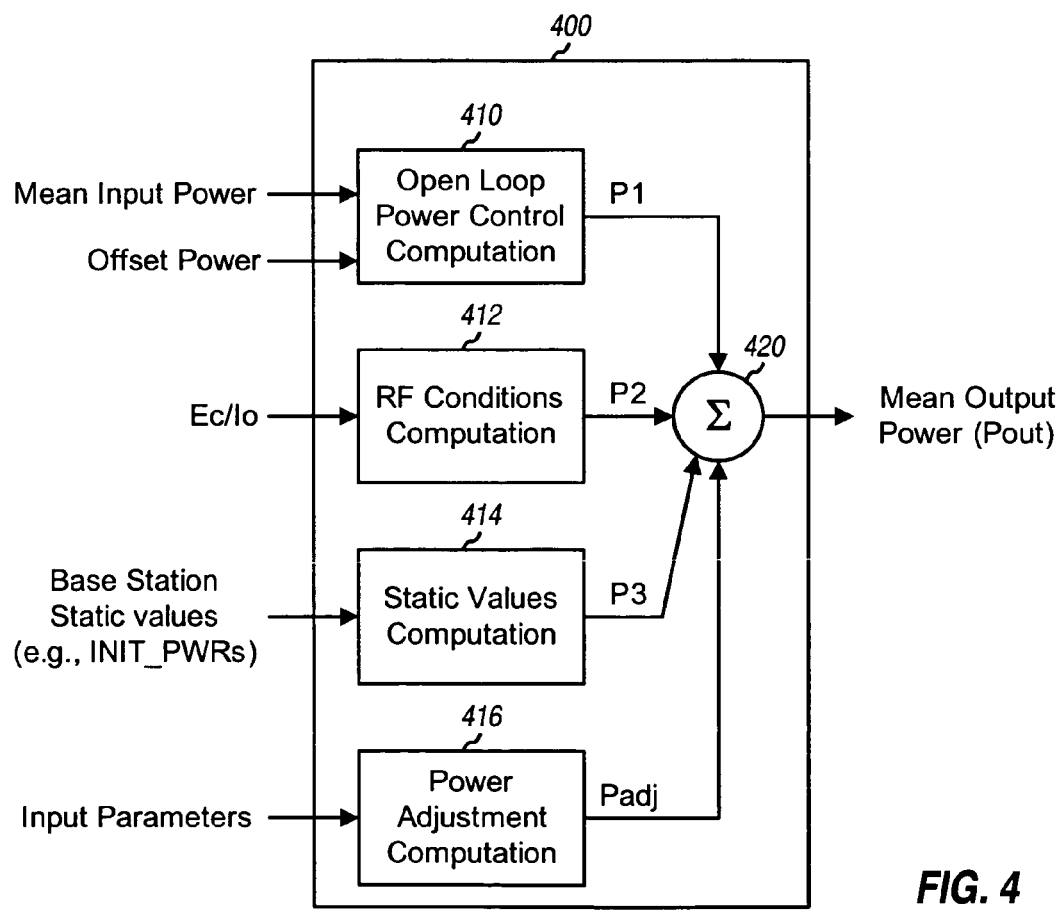
FIG. 4 shows an embodiment of output power computation for the R-ACH or R-EACH with power adjustment by a wireless device.

FIG. 4 shows an embodiment of an apparatus 400 for computing the output power, with power adjustment by a wireless device, for each access probe sent on the R-ACH or R-EACH. Apparatus 400 includes units 410, 412 and 414 that operate in the same manner as units 310, 312 and 314, respectively, in FIG. 3. A power adjustment unit 416 receives one or more parameters used for adjustment of the output power by the wireless device and computes a fourth intermediate value, Padj, which is a power adjustment that attempts to reduce the output power. A summer 420 sums the first, second, third and fourth intermediate values from units 410, 412, 414 and 416, respectively, and provides the output power, which is Pout=P1+P2+P3+Padj.

Power adjustment unit 416 may compute the power adjustment, Padj, based on various parameters such as, e.g., the current RF conditions, the RF conditions observed in one or more prior access attempts, the performance for the prior access attempt(s), and so on. The RF conditions may be quantified by various metrics such as, e.g., total received power, received pilot power, pilot Ec/Io, received signal quality, and so on. The performance for the prior access attempt(s) may be quantified by various metrics such as, e.g., the number of access probes sent for the most recent access attempt, the average number of access probes sent for some number of prior access attempts, and so on. The power adjustment may also be computed based on various algorithms and functions.

The following goals should be considered in deriving the power adjustment:

1. Convergence—the power adjustment should approach an optimal value that can provide good performance in any RF conditions;
2. Adaptive—the power adjustment should adapt to changes in RF conditions but should not be sensitive to fast fading; and
3. Power saving—the power adjustment should not result in the output power being higher than if the power adjustment was not applied, so that Padj≤0.

Good performance may be quantified, e.g., by requiring only one or two access probes for an access attempt.

Figure 5:
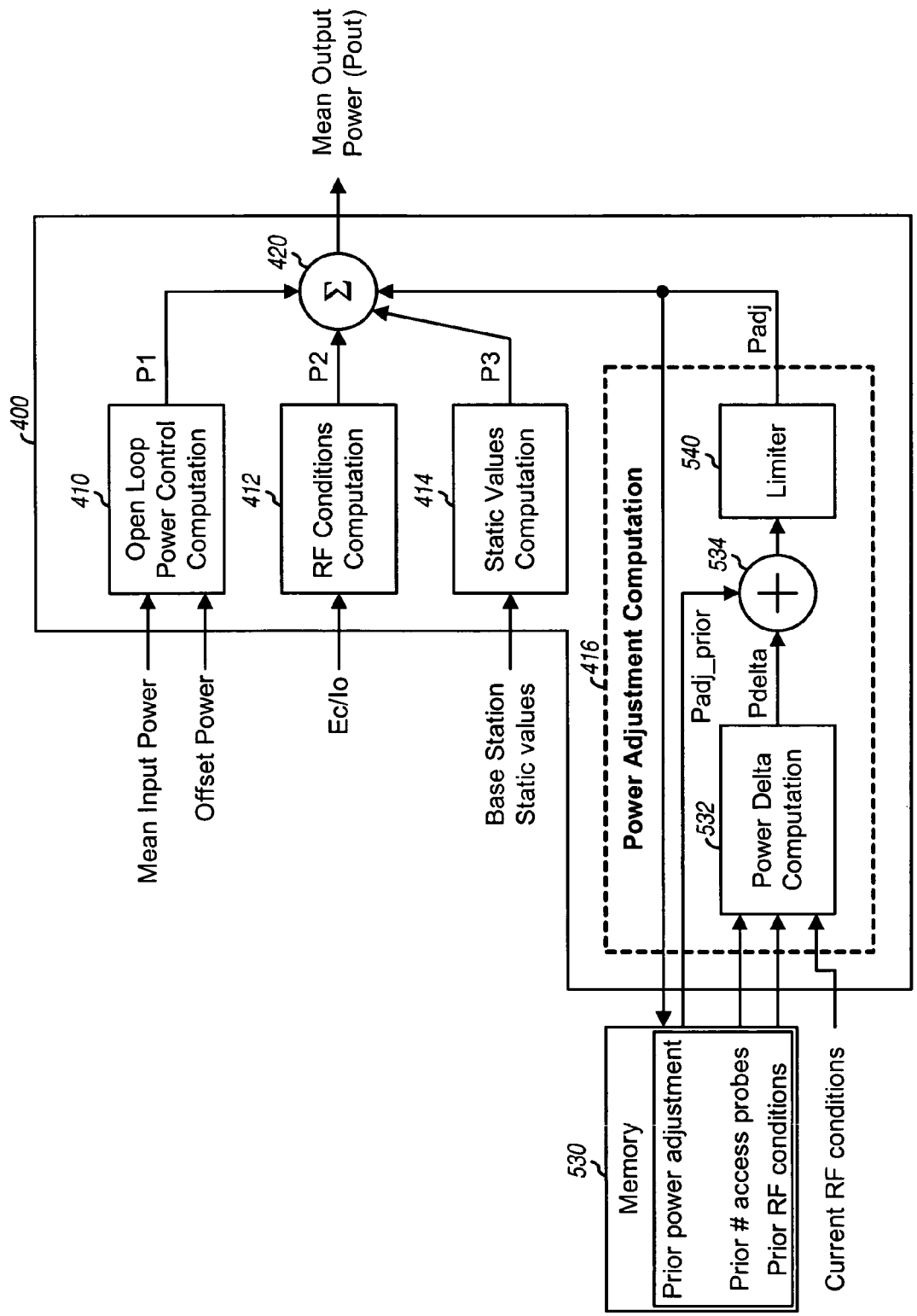
FIG. 5 shows a power adjustment unit.

FIG. 5 shows an embodiment of power adjustment unit 416 in FIG. 4. For this embodiment, the power adjustment is derived based on the current RF conditions, prior RF conditions, prior number of access probes, and prior power adjustment. The prior RF conditions are the RF conditions for the prior access attempt. The prior number of access probes is the number of access attempts for the prior access attempt. The prior power adjustment is the power adjustment for the prior access attempt. For this embodiment, the prior RF conditions, prior number of access probes, and prior power adjustment are historical information that is stored in a memory 530. A computation unit 532 receives the current and prior RF conditions and the prior number of access probes and derives a power delta, Pdelta, based on the input parameters. Unit 532 may be implemented with a look-up table, as described below. A summer 534 receives and sums the prior power adjustment, Padj_prior, with the power delta. A limiter 540 receives and limits the output of summer 534 to zero or less and provides the power adjustment, Padj, for the current access attempt.

For the embodiment shown in FIG. 5, the initial power level selected by the wireless device is equal to the initial power level provided by the base station plus the power adjustment, or $$Pinit\_wd = Pinit\_bs + Padj. \quad \text{Eq (3)}$$

Since Padj≤0 due to limiter 540, Pinit_wd≤Pinit_bs and goal 3 above is satisfied. The power adjustment is added with P1, P2 and P3 by summer 420. For the embodiment shown in FIG. 5, the power adjustment is explicitly computed, and the initial power level selected by the wireless device, Pinit_wd, is implicitly computed.

For the embodiment shown in FIG. 5, memory 530, computation unit 532, summer 534, and limiter 540 form a close loop that varies the power adjustment, Padj, based on the current and historical information to achieve good performance.

Figure 6:
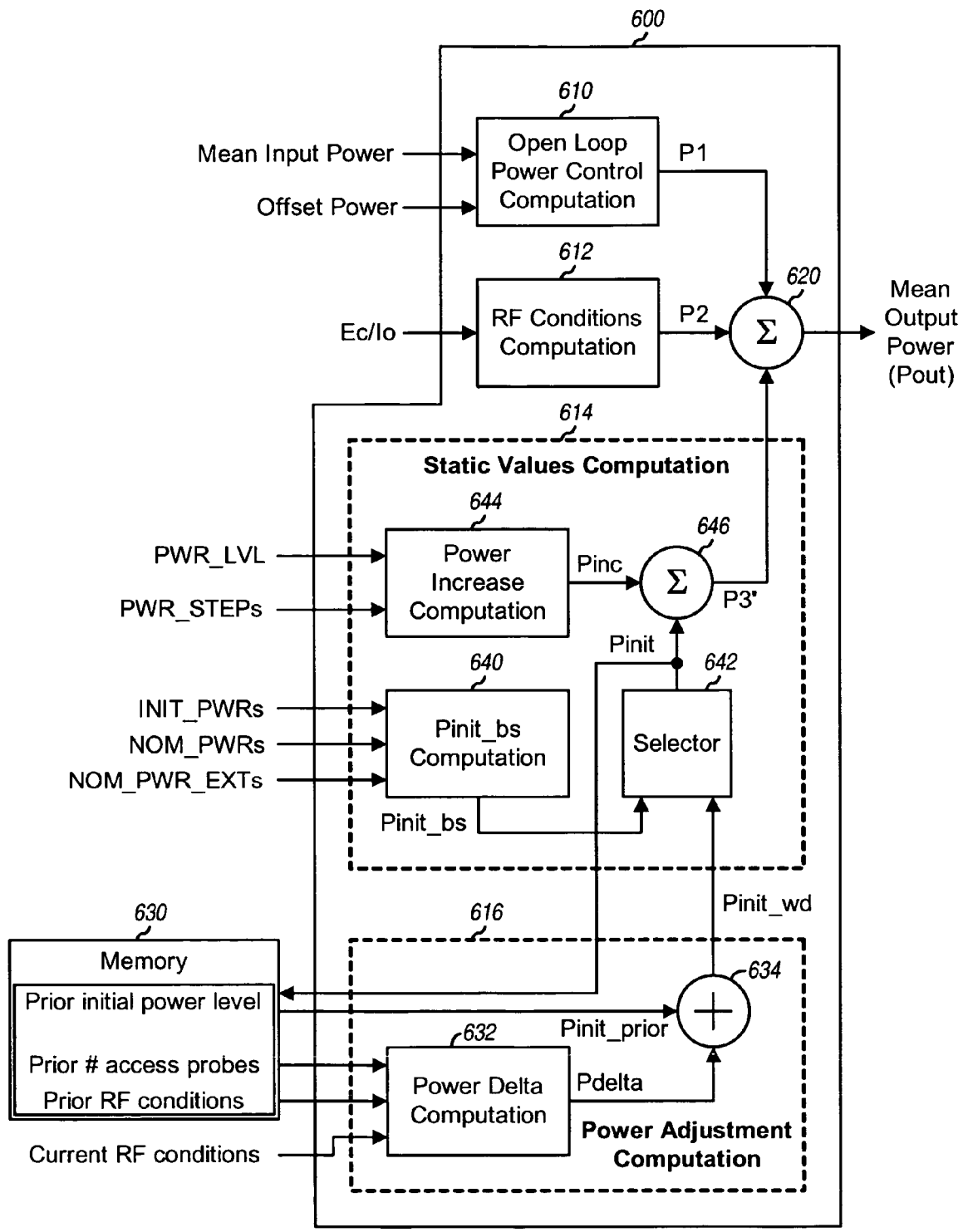
FIG. 6 shows another embodiment of output power computation for the R-ACH or R-EACH with power adjustment by the wireless device.

FIG. 6 shows an embodiment of an apparatus 600 that may also be used to compute the output power, with power adjustment by the wireless device, for each access probe sent on the R-ACH or R-EACH. Apparatus 600 includes units 610 and 612 that operate in the same manner as units 310 and 312, respectively, in FIG. 3. A power adjustment unit 616 derives the initial power level selected by the wireless device, Pinit_wd, and a computation unit 614 computes the third intermediate value, P3, with the initial power level Pinit_wd.

For the embodiment shown in FIG. 6, the initial power level Pinit_wd is derived based on the current and prior RF conditions, the prior number of access probes, and the prior initial power level. The prior initial power level is the initial power level for the prior access attempt. For this embodiment, the prior RF conditions, prior number of access probes, and prior initial power level are historical information that is stored in a memory 630. Within power adjustment unit 616, a computation unit 632 receives the current and prior RF conditions and the prior number of access probes and derives a power delta, Pdelta, based on the input parameters. Unit 632 may be implemented with a look-up table, as described below. A summer 634 receives and sums the prior initial power level, Pinit_prior, with the power delta and provides the initial power level Pinit_wd for the current access attempt. For the embodiment shown in FIG. 6, the initial power level Pinit_wd is explicitly computed. Memory 630, computation unit 632, and summer 634 form a close loop that varies the initial power level Pinit_wd based on the current and historical information to achieve good performance.

Within computation unit 614, a computation unit 640 receives the static values INIT_PWRs, NOM_PWRs and NOM_PWR_EXTs and derives the initial power level provided by the base station, Pinit_bs. A selector 642 receives the initial power level provided by the base station, Pinit_bs, and the initial power level selected by the wireless device, Pinit_wd, and provides the lower of the two values as the initial power level to use for the current access attempt, Pinit. A computation unit 644 receives and multiplies the power level adjustment step, PWR_LVL, with the current access probe number, PWR_STEPs, and provides a power increase value, Pinc, for the current access probe. A summer 646 sums the initial power level Pinit and the power increase value and provides the third intermediate value, P3'.

A summer 620 sums the intermediate values P1, P2 and P3' from units 610, 612 and 614, respectively, and provides the output power, Pout, which may be expressed as:

$$\begin{aligned}\text{mean output} \\ \text{power}(\text{dB}m)\end{aligned} = -\text{mean input power}(\text{dB}m) + \quad \text{Eq (4)}$$
$$\text{offset power} +$$
$$\text{interference correction} +$$
$$\text{initial power level}(Pinit) +$$
$$\text{PWR\_LVL} \times \text{PWR\_STEPs}.$$

Comparing equation (4) to equation (1), the static values INIT_PWRs, NOM_PWRS and NOM_PWR_EXTs are replaced with the initial power level for the current access attempt, Pinit. For the embodiment shown in FIG. 6, the power adjustment is implicitly computed, and the initial power level selected by the wireless device is explicitly computed.

For the embodiments shown in FIGS. 5 and 6, the power delta, Pdelta, is derived based on the current and prior RF conditions and the prior number of access probes. The difference between the current and prior RF conditions may be initially determined, as follows:

$$\begin{aligned}RF \text{ Difference in conditions} = \text{current } RF \text{ conditions} - \\ \text{prior } RF \text{ conditions.}\end{aligned} \quad \text{Eq (5)}$$

The RF conditions may be given by pilot Ec/Io, received pilot power, total received power, and so on.

In general, the power adjustment, Padj, and hence the output power may be reduced if the performance for the prior access attempt was good (e.g., few access probes were sent) and may be increased if the performance was poor (e.g., too many access probes were sent). Furthermore, the power adjustment may be reduced if the current RF conditions have improved since the last access attempt and may be increased if the current RF conditions have degraded since the last access attempt. The difference in RF conditions and the prior number of access probes may be provided to a look-up table, which may then return a power delta, Pdelta. The power delta indicates whether to vary or maintain the power adjustment and which direction and how much to vary the power adjustment, if any.

Table 1 shows an exemplary look-up table for power delta (Pdelta) versus the difference in RF conditions (x) and the prior number of access probes, where Pdelta and x are given in units of dB. In Table 1, a positive value for the difference in RF conditions indicates that the current RF conditions have improved over the prior RF conditions. For the example in Table 1, if the performance of the prior access attempt was good, requiring only one access probe, then the power delta is negative and decreases the power adjustment if the RF conditions have improved or have not degraded by more than 2 dB, with a larger power delta being used for more improvement in RF conditions. If the performance was fair, requiring two access probes, then the power delta is positive and increases the power adjustment if the RF conditions have not improved by more than 3 dB, with a larger power delta being used for more degradation in RF conditions. If the performance was poor, requiring three access probes, then the power delta is positive and increases the power adjustment if the RF conditions have not improved by more than 4 dB, with a larger power delta being used for more degradation in RF conditions. The power delta is reset and the initial power level provided by the base station, Pinit_bs, is used if (1) the performance was very poor, requiring more than three access probes, or (2) the RF conditions have degraded more than 5 dB for good performance or more than 3 dB for fair or poor performance for the last access attempt.

TABLE 1

| Prior number of access probes | Difference in RF conditions (x) in dB | Power delta (Pdelta) in dB | |
|---|---|---|---|
| 1 good performance | $x \geq 4$ | −3.5 | ↑ |
| | $x \geq 2$ | −2.0 | Improving |
| | $x \geq 1$ | −1.5 | RF conditions |
| | $x \geq -1$ | −1.0 | |
| | $x \geq -2$ | −0.5 | |
| | $x \geq -4$ | 0.0 | |
| | $x \geq -5$ | 0.5 | |
| | $x < -5$ | use Pinit_bs | |
| 2 fair performance | $x \geq 3$ | 0.0 | ↑ |
| | $x \geq 1$ | 0.5 | Improving |
| | $x \geq -1$ | 1.0 | RF conditions |
| | $x \geq -3$ | 1.5 | |
| | $x < -3$ | use Pinit_bs | |
| 3 poor performance | $x \geq 4$ | 0.0 | ↑ |
| | $x \geq 2$ | 0.5 | Improving |
| | $x \geq -1$ | 1.5 | RF conditions |
| | $x \geq -3$ | 2.0 | |
| | $x < -3$ | use Pinit_bs | |
| >3 | — | use Pinit_bs | |

Table 1 shows a specific design with multiple threshold values for each of the two input parameters. In general, any number of input parameters may be mapped to power delta using any number of threshold values for each input parameter. The threshold values may be static or dynamic values. The input parameters may also be mapped to power delta in other manners and/or based on other look-up tables. For example, the power delta may be derived based on a linear function of the input parameters and constrained within specified limits. The input parameters may jointly map to the power delta, e.g., as shown in Table 1. Alternatively, each input parameter may be independently mapped to an adjustment value, and the adjustment values for all input parameters may be combined (e.g., summed) to obtain the power delta.

The performance for the prior access attempt was achieved using a power value derived for the prior access attempt (e.g., Padj_prior or Pinit_prior) and for the prior RF conditions. The prior power value is varied by the power delta, which is determined based on changes in the RF conditions and the prior access performance, such that good performance may be achieved for the current access attempt. The power delta values shown in Table 1 are estimates of how much to vary the prior power value for different amounts of changes in the RF conditions and for different levels of performance for the prior access attempt. The power delta values may be obtained via computer simulation, empirical measurements, field testing, and so on.

As noted above, different values for INIT_PWRs, NOM_PWRs and NOM_PWR_EXTs may be selected for use, and the selected INIT_PWRs, NOM_PWRs and NOM_PWR_EXTs values are broadcast to the wireless devices. Different Pinit_bs values are obtained with different INIT_PWRs, NOM_PWRs and NOM_PWR_EXTs values and may be indicative of different channel conditions, different system loading, and so on. In an embodiment, the wireless device maintains the historical information separately for each Pinit_bs value provided by the base station.

Table 2 shows an exemplary table of historical information for n different Pinit_bs values, where n may be any integer value. Table 2 is for the embodiments shown in FIG. 6 and stores the initial power level Pinit, the number of access probes, and the RF conditions for the last access attempt for each Pinit_bs value. The wireless device may build up Table 2 for each new Pinit_bs value provided by the base stations. The wireless device may update the proper entry (or column) of Table 2 after each access attempt.

TABLE 2

| | | | | |
|---|---|---|---|---|
| Initial power level provided by base station (Pinit_bs) | B1 | B2 | ... | Bn |
| Initial power level used for prior access attempt (Pinit) | Y1 | Y2 | ... | Yn |
| Number of access probes for prior access attempt | Z1 | Z2 | ... | Zn |
| RF conditions for prior access attempt | R1 | R2 | ... | Rn |

Prior to making an access attempt, the wireless device determines the current Pinit_bs value for the base station to which the access attempt is to be made. The wireless device then uses the historical information for this Pinit_bs value to derive the power value (e.g., Padj or Pinit). For example, if the current Pinit_bs value is equal to B2, then the wireless device uses Y2, Z2, and R2 to derive the power value.

The techniques described herein may also be used for a 1xEV-DO network. A wireless device enters a 1xEV-DO access state and performs an access procedure in order to access the 1xEV-DO network. For the access procedure, the wireless device may transmit up to $N_s$ access probe sequences to the 1xEV-DO network and may transmit up to $N_p$ access probes for each access probe sequence, where $N_p$ and $N_s$ are configurable parameters.

Prior to sending the first access probe sequence, the wireless device performs a persistence test, which is used to control congestion on the access channel. If the persistence test passes, then the wireless device transmits the first access probe on the access channel and then listens for an access channel acknowledgment (ACAck) message from the 1xEV-DO network. If an ACAck message is not received, then the wireless device waits a pseudo-random duration and then transmits the second access probe. The wireless device transmits each subsequent access probe in the same manner. If the wireless device transmits all $N_p$ access probes for the first access probe sequence and does not receive an ACAck message, then the wireless device waits a pseudo-random duration and starts a second access probe sequence. The wireless device may transmit up to $N_s$ access probe sequences for the access procedure. The access procedure for 1xEV-DO is described in 3GPP2C.S0024-A, entitled "cdma2000 High Rate Packet Data Air Interface Specification," Version 1.0, March 2004, which is publicly available.

For each access probe sequence, the wireless device transmits the access probes at increasing output power. The output power for the i-th access probe may be expressed as:

$$\text{Output power} = X_0 + (i-1) \times \text{PowerStep, and} \quad \text{Eq (6)}$$

$$X_0 = -\text{Mean } Rx \text{ Power} + \text{OpenLoopAdjust} + \text{ProbeInitialAdjust,} \quad \text{Eq (7)}$$

where Mean Rx Power is the total received power measured by the wireless device;

$X_0$ is the output power for the first access probe;

OpenLoopAdjust is a nominal power used for an open loop power estimate;

ProbeInitialAdjust is a correction factor for the open loop power estimate; and

PowerStep is the increase in output power for each access probe.

In equations (6) and (7), OpenLoopAdjust, ProbeInitialAdjust, and PowerStep are static values that are broadcast by the base stations in the 1xEV-DO network.

The wireless device may derive a power adjustment, Padj, based on the current and historical information, e.g., as described above for FIGS. 4 and 5. The wireless device may then determine the output power using this power adjustment as follows:

$$\text{Output power} = X_0 + (i-1) \times \text{PowerStep} + P\text{adj.} \quad \text{Eq (8)}$$

Alternatively, the wireless device may derive $X_0$ or some other intermediate value to incorporate the power adjustment, e.g., as described above for FIG. 6. The wireless device may also adjust the output power for the access probes in other manners to incorporate the power adjustment.

The techniques described herein may also be used for a UMTS network. A wireless device may use a random access channel (RACH) for initial access to the network (e.g., for registration, call origination, and paging response) and also for sending short data bursts (e.g., for Short Messaging Service (SMS) messages). The RACH is a transport channel and is carried in a physical random access channel (PRACH).

The wireless device performs a physical random access procedure for a random-access transmission on the PRACH. For this procedure, the wireless device transmits one or more preambles followed by a message. The preambles are transmitted one at a time and at increasing power until an acknowledgment (ACK) is received from the network. If an ACK is received, then the wireless device transmits the message. The physical random access procedure for UMTS is described in 3GPP TS 25.211 and 3GPP TS 25.214, which are publicly available.

For a random-access transmission, the wireless device transmits each preamble at increased power. The output power for the i-th preamble may be expressed as:

$$P\text{out} = \text{Preamble\_Initial\_Power} + (i-1) \times \text{Power Ramp Step,} \quad \text{Eq (9)}$$

$$\text{Preamble\_Initial\_Power} = -\text{CPICH\_RSCP} + \quad \text{Eq (10)}$$
$$\text{Primary } CPICH \text{ } TX \text{ power} +$$
$$UL \text{ interference} +$$
$$\text{Constant value,}$$

where

Primary CPICH TX power is the transmit power for the pilot sent on the CPICH;

CPICH_RSCP is the received pilot power measured by the wireless device;

UL interference is a correction factor;

Constant value is an offset;

Preamble_Initial_Power is the output power for the first preamble; and

Power Ramp Step is the increase in output power for each preamble.

In equations (9) and (10), Primary CPICH TX power, UL interference, Constant value, and Power Ramp Step are static values that are broadcast by the base stations in the UMTS network.

The wireless device may derive a power adjustment, Padj, based on the current and historical information, e.g., as described above for FIGS. 4 and 5. The wireless device may then determine the output power using this power adjustment as follows:

$$P\text{out} = \text{Preamble\_Initial\_Power} + (i-1) \times \text{Power Ramp Step} + P\text{adj.} \quad \text{Eq (11)}$$

Alternatively, the wireless device may derive Preamble_Initial_Power or some other intermediate value to incorporate the power adjustment, e.g., as described above for FIG. 6. The wireless device may also adjust the output power for the random-access transmission in other manners to incorporate the power adjustment.

Figure 7:
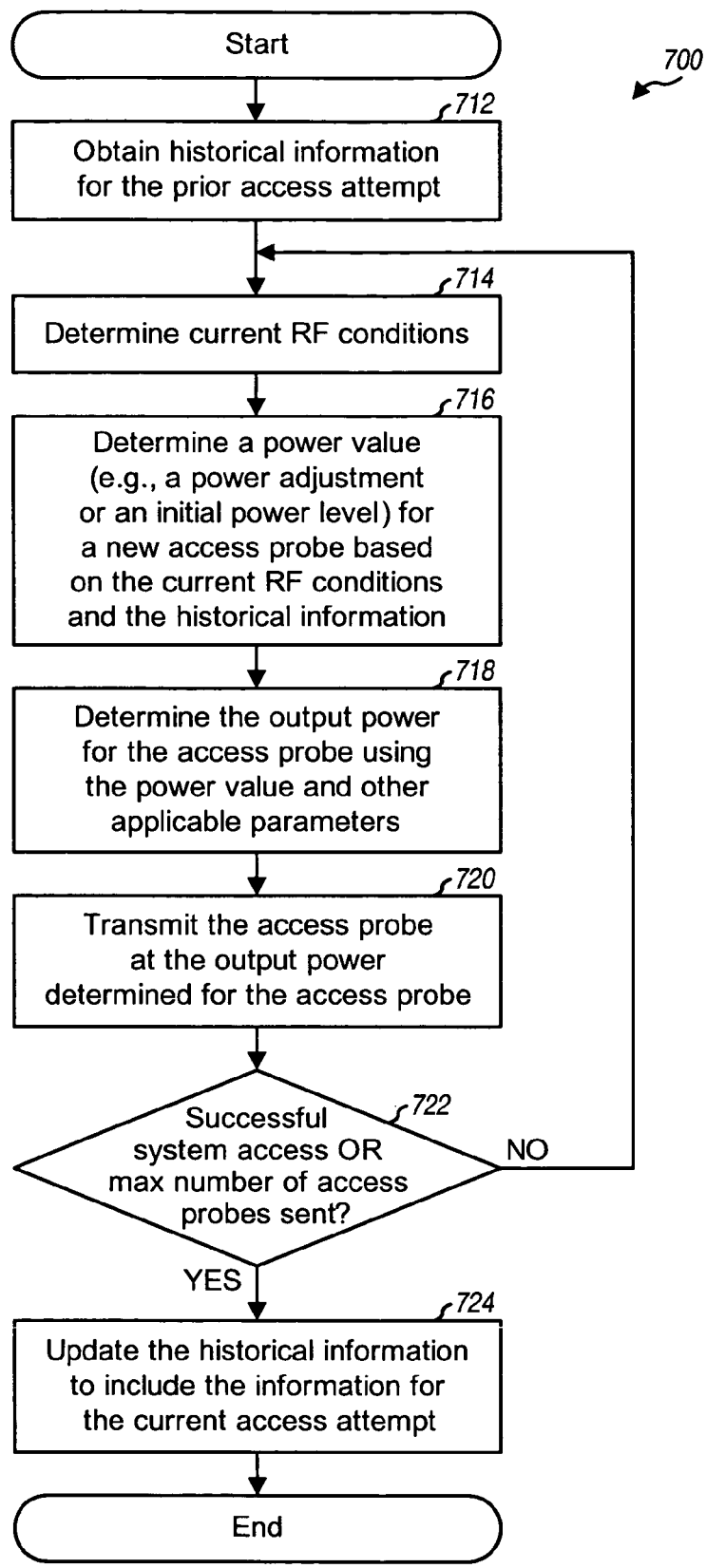
FIG. 7 shows a process for transmitting on an access channel.

FIG. 7 shows an embodiment of a process 700 performed by a wireless device for transmission on an access channel in a communication network. Process 700 may be performed for each access attempt.

At the start of an access attempt, the historical information for the prior access attempt is obtained (block 712). This historical information may include the RF conditions for the prior access attempt, the number of access probes sent for the prior access attempt, a power value used for the prior access attempt, and so on. The power value may be a power adjustment as shown in FIG. 5, an initial power level as shown in FIG. 6, or some other value used to compute the output power for the access channel. The historical information may also be dependent on the initial power level applicable for the current access attempt, e.g., as described above for Table 2.

The current RF conditions are determined (block 714). The RF conditions may be quantified by various parameters such as, e.g., the total received power, pilot Ec/Io, received pilot power, received signal quality, and so on, as described above. A power value for a new access probe to be sent for the current access attempt is then determined based on the current RF conditions and the historical information (block 716). The power value may be determined in various manners, e.g., as described above for FIGS. 5 and 6. The power value may be adjusted in a closed loop manner to achieve good performance. The amount of adjustment to the power value may be dependent on the prior performance (e.g., the number of access probes sent for the prior access attempt), changes in the RF conditions between the current and prior access attempts, and so on.

The output power for the new access probe is determined using the power value and other applicable parameters (block 718). The communication network may define a specific equation for computing the output power for an access probe and may also provide static values. The power value may be treated as an extra parameter, e.g., as the power adjustment, Padj, shown in equations (8) and (11). The power value may also replace a parameter in the equation, e.g., as the initial power level Pinit shown in equation (4). In any case, the output power for the new access probe is determined and adjusted based on the current and historical information.

The new access probe (or preamble) is transmitted at the output power determined for this access probe (block 720). A determination is then made whether system access was successful OR the maximum number of access probes has been sent for the current access attempt (block 722). If neither condition in block 722 is true, then process 700 returns to block 714 to send another access probe. Otherwise, if any one of the conditions in block 722 is true, then the current access attempt terminates. Upon completing the current access attempt, the historical information is updated to include the information for this access attempt (block 724). For example, the power value, RF conditions, and number of access probes sent for the current access attempt may overwrite the corresponding entries for the prior access attempt.

For the embodiments described above, the historical information is maintained for the most recent access attempt. In general, the historical information may be maintained for any number of access attempts. Furthermore, the historical information may include any type of information. For example, the historical information may include the location of the wireless device and/or the time when an access attempt is made, and so on. The power value for the current access attempt may then be determined based on the additional information.

Figure 8:
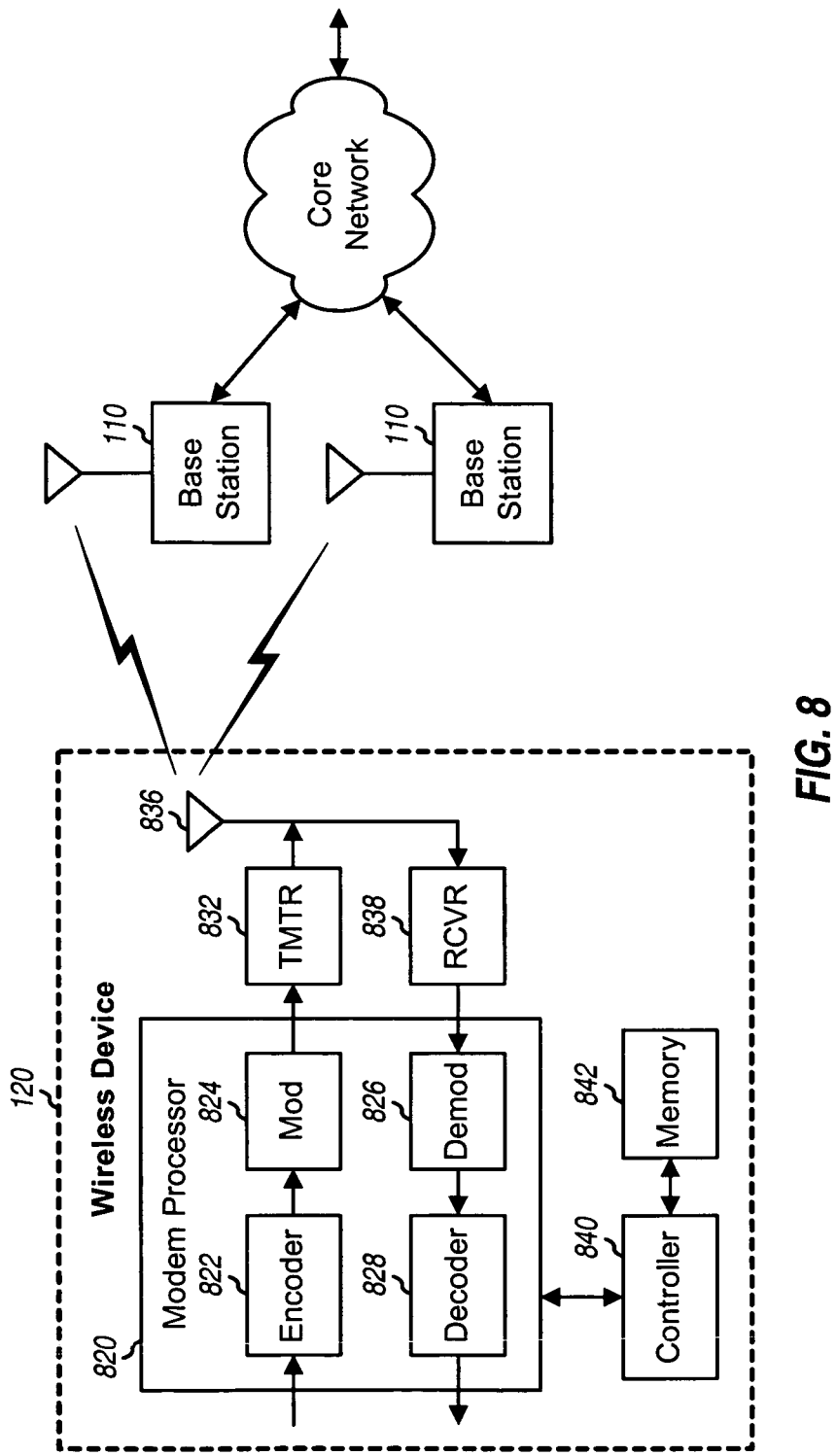
FIG. 8 shows a block diagram of the wireless device.

FIG. 8 shows an embodiment of a wireless device 120 capable of implementing the techniques described herein. On the transmit path, data and signaling to be sent by wireless device 120 are processed (e.g., formatted, encoded, and interleaved) by an encoder 822 and further processed (e.g., modulated, spread, channelized, and scrambled) by a modulator (Mod) 824 to generate a stream of data chips. A transmitter (TMTR) 832 conditions (e.g., converts to analog, filters, amplifies, and frequency upconverts) the data chip stream to generate a reverse link signal, which is transmitted via an antenna 836. On the receive path, forward link signals transmitted by base stations in the network are received by antenna 836 and provided to a receiver (RCVR) 838. Receiver 838 conditions (e.g., filters, amplifies, frequency downconverts, and digitizes) the received signal to generate data samples. A demodulator (Demod) 826 processes (e.g., descrambles, despreads, channelizes, and demodulates) the data samples to obtain symbol estimates. A decoder 828 further processes (e.g., deinterleaves and decodes) the symbol estimates to obtain decoded data. Encoder 822, modulator 824, demodulator 826, and decoder 828 may be implemented by a modem processor 820. These units perform processing as specified by the network.

A controller/processor 840 directs the operation of various units within wireless device 120. A memory 842 stores program codes and data used by controller/processor 840 and other units. Controller/processor 840 may implement apparatus 400 in FIG. 5, apparatus 600 in FIG. 6, and/or process 700 in FIG. 7 to control the output power for transmission on the access channel.

Figure 9:
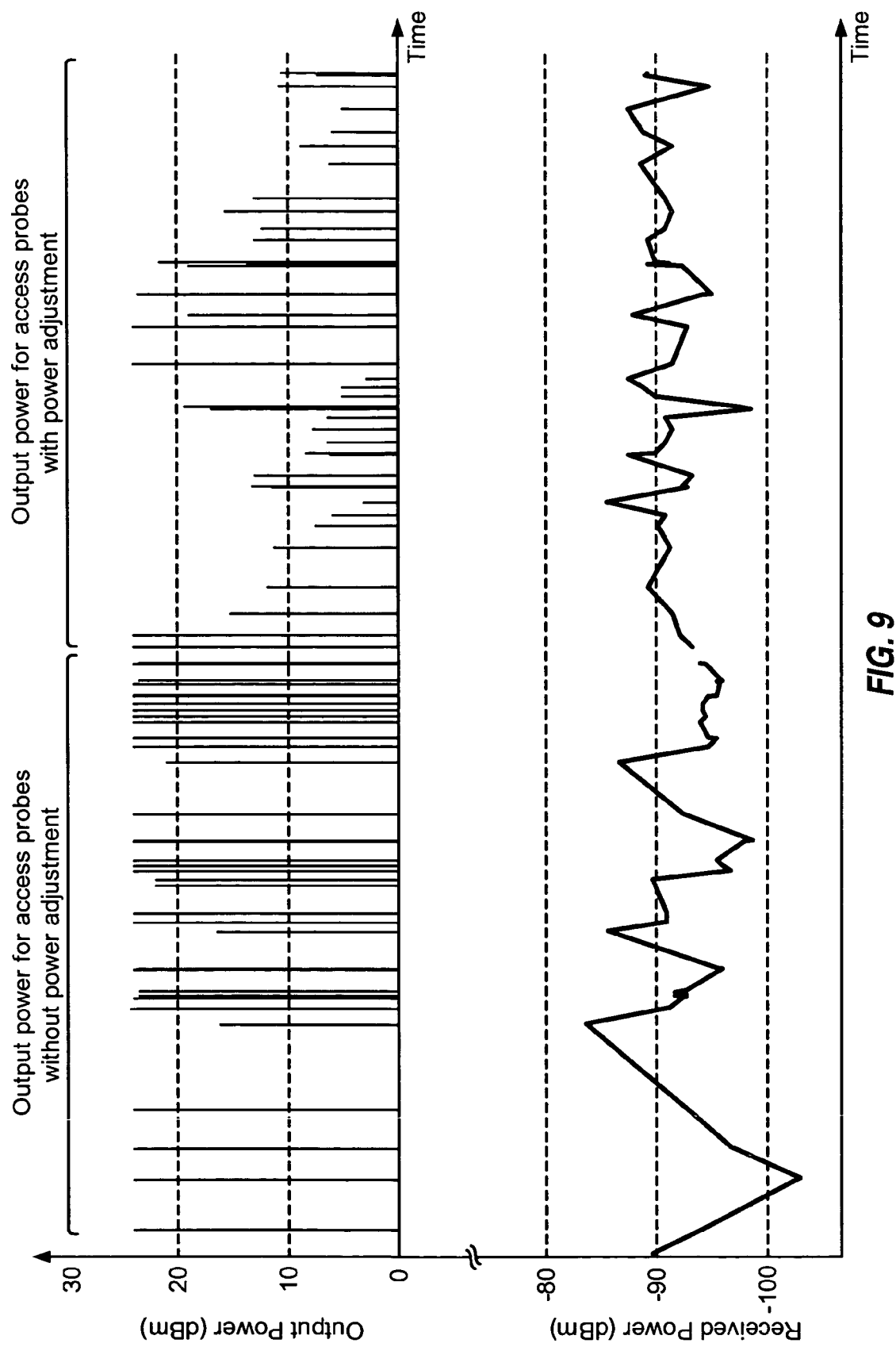
FIG. 9 shows performance with and without the power adjustment.

FIG. 9 shows results of a field test for transmissions on an access channel in a CDMA2000 1X network without and with the power adjustment described herein. The output power used for the first access probe in each access attempt is plotted as a vertical line in the top half of FIG. 9. The received power at the wireless device is shown in the bottom half of FIG. 9. The left half of FIG. 9 shows the results for the portion of the test without the power adjustment. For this test portion, 32 access attempts were made, the average number of access probes per access attempt was 1.3, and the average output power for the access probes was 23 dBm. The right half of FIG. 9 shows the results for the portion of the test with the power adjustment. For this test portion, 34 access attempts were made, the average number of access probes per access attempt was 1.2, and the average output power for the access probes was 11.7 dBm. The average power adjustment was 12.5 dB. The slight difference in performance between the two test portions was due to random fluctuations in the received power. The test indicated that the wireless device could reduce its output power for the access channel by a relatively large amount (approximately 12 dB for this test) and still achieve good access performance.

A wireless device may periodically transmit access probes even when the wireless device is not in call set up with a network, e.g., for registration and other purposes. The lower output power for the access channel can provide various benefits. First, the wireless device can reduce its power consumption and possibly extend battery life by using less output power for transmission on the access channel. Second, the lower output power for the access channel can reduce interference on the reverse link, which may improve system capacity.

The techniques described herein may be implemented by various means. For example, these techniques may be implemented in hardware, firmware, software, or a combination thereof. For a hardware implementation, the processing units used for the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 842 in FIG. 8) and executed by a processor (e.g., processor 840). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   a memory configured to store, at a wireless device, historical information for a prior access attempt initiated by the wireless device to access a communication network, wherein the historical information for the prior access attempt is determined based on measurements performed only by the wireless device and is not based on measurements sent by the communication network for prior access attempts by the wireless device, and the historical information for the prior access attempt includes a number of access probes sent for the prior access attempt initiated by the wireless device; and
   a processor coupled to the memory and configured to determine a power value based on the historical information for the prior access attempt, and to use the power value for transmission by the wireless device on an access channel for a current access attempt to access the communication network.

2. The apparatus of claim 1, wherein the processor is configured to use the power value to determine an output power for each access probe to be sent on the access channel, and to send each access probe at the output power determined for the access probe.

3. The apparatus of claim 2, wherein the power value is for a power adjustment, the output power for each access probe comprises first and second portions, the first portion corresponds to the output power for the access probe without considering the historical information, and the second portion corresponds to the power adjustment.

4. The apparatus of claim 2, wherein the power value is for an initial power level used to compute the output power for each access probe.

5. The apparatus of claim 2, wherein the processor is configured to limit the output power for each access probe to less than or equal to an output power for the access probe without considering the historical information.

6. The apparatus of claim 1, wherein the processor is configured to compute an output power for a first access probe in the current access attempt based on the power value, and to compute an output power for each subsequent access probe based on the output power for the first access probe and a power step.

7. The apparatus of claim 1, wherein the historical information is the number of access probes sent for the prior access attempt, the memory is configured to store the number of access probes sent for the prior access attempt, and the processor is configured to determine the power value for the current access attempt based on the number of access probes sent for the prior access attempt.

8. The apparatus of claim 1, wherein the historical information is the RF conditions for the prior access attempt, the memory is configured to store the RF conditions for the prior access attempt, and the processor is configured to determine the power value for the current access attempt based on the RF conditions for the prior access attempt and RF conditions for the current access attempt.

9. The apparatus of claim 8, wherein the processor is configured to determine a difference between the RF conditions for the current and prior access attempts, and to determine the power value for the current access attempt based on the difference between the RF conditions.

10. The apparatus of claim 9, wherein the processor is configured to adjust a power value used for the prior access attempt by an amount determined by the difference between the RF conditions, and to use the adjusted power value as the power value for the current access attempt.

11. The apparatus of claim 9, wherein the processor is configured to determine a power delta based on the difference between the RF conditions and the number of access probes sent for the prior access attempt, and to determine the power value for the current access attempt based on a power value for the prior access attempt and the power delta.

12. The apparatus of claim 1, wherein the communication network is a cdma2000 network.

13. The apparatus of claim 1, wherein the communication network is a Universal Mobile Telecommunication Systems (UMTS) network.

14. A method, comprising:
obtaining historical information, stored at a wireless device, for a prior access attempt initiated by the wireless device to access a communication network, wherein the historical information for the prior access attempt is determined based on measurements performed only by the wireless device and is not based on measurements sent by the communication network for prior access attempts by the wireless device, and the historical information for the prior access attempt includes a number of access probes sent for the prior access attempt initiated by the wireless device;
determining a power value based on the historical information for the prior access attempt; and
using the power value for transmission by the wireless device on an access channel for a current access attempt to access the communication network.

15. The method of claim 14, wherein using the power value for transmission on the access channel comprises:
determining an output power for each access probe to be sent on the access channel based on the power value; and
sending each access probe at the output power determined for the access probe.

16. The method of claim 15, wherein the determining the output power for each access probe comprises limiting the output power for each access probe to less than or equal to an output power for the access probe without considering the historical information.

17. The method of claim 14, further comprising:
computing an output power for a first access probe in the current access attempt based on the power value; and
computing an output power for each subsequent access probe based on the output power for the first access probe and a power step.

18. An apparatus, comprising:
means for obtaining historical information, stored at a wireless device, for a prior access attempt initiated by the wireless device to access a communication network, wherein the historical information for the prior access attempt is determined based on measurements performed only by the wireless device and is not based on measurements sent by the communication network for prior access attempts by the wireless device, and the historical information for the prior access attempt includes a number of access probes sent for the prior access attempt initiated by the wireless device;
means for determining a power value based on the historical information for the prior access attempt; and
means for using the power value for transmission by the wireless device on an access channel for a current access attempt to access the communication network.

19. The apparatus of claim 18, wherein the means for using the power value for transmission on the access channel comprises:
means for determining an output power for each access probe to be sent on the access channel based on the power value; and
means for sending each access probe at the output power determined for the access probe.

20. The apparatus of claim 19, wherein the means for determining the output power for each access probe comprises means for limiting the output power for each access probe to less than or equal to an output power for the access probe without considering the historical information.

21. A non-transitory processor-readable media storing instructions operable in a wireless device, that when executed, cause the wireless device to:
obtain historical information, stored at the wireless device, for a prior access attempt initiated by the wireless device to access a communication network, wherein the historical information for the prior access attempt is determined based on measurements performed only by the wireless device and is not based on measurements sent by the communication network for prior access attempts by the wireless device, and the historical information for the prior access attempt includes a number of access probes sent for the prior access attempt initiated by the wireless device;

determine a power value based on the historical information for the prior access attempt; and use the power value for transmission by the wireless device on an access channel for a current access attempt to access the communication network.

22. The processor-readable media of claim 21, further storing instructions, that when executed, cause the wireless device to:

determine an output power for each access probe to be sent on the access channel based on the power value, and send each access probe at the output power determined for the access probe.

23. The processor-readable media of claim 22, further storing instructions, that when executed, cause the wireless device to limit the output power for each access probe to less than or equal to an output power for the access probe without considering the historical information.

* * * * *